United States Patent
Sabnani et al.

(10) Patent No.: US 6,393,296 B1
(45) Date of Patent: *May 21, 2002

(54) E-MAIL ACCESS FROM CELLULAR/PCS PHONES USING USER AGENTS

(75) Inventors: Krishan Kumar Sabnani, Westfield; Thomas Yat Chung Woo, Red Bank, both of NJ (US)

(73) Assignee: Lucent Technologies, Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/832,086

(22) Filed: Apr. 3, 1997

(51) Int. Cl.[7] ................................................ H04Q 7/20
(52) U.S. Cl. ........................................ 455/466; 455/412
(58) Field of Search ................................ 455/412, 414, 455/418, 419, 466, 517, 566, 31.2, 445, 458, 461; 379/88.13; 340/825.44

(56) References Cited

U.S. PATENT DOCUMENTS

| 4,385,295 | A | * | 5/1983 | Willard et al. ......... 340/825.44 |
| 4,412,217 | A | * | 10/1983 | Willard et al. ......... 340/825.44 |
| 5,577,103 | A | * | 11/1996 | Foti ............................. 455/412 |
| 5,635,918 | A | * | 6/1997 | Tett ............................. 455/466 |
| 5,724,410 | A | * | 3/1998 | Parvulescu et al. ............ 379/88 |
| 5,727,057 | A | * | 3/1998 | Emery et al. ................ 455/456 |
| 5,734,981 | A | * | 3/1998 | Kennedy, III et al. ....... 455/445 |
| 5,737,395 | A | * | 4/1998 | Irribarren ................. 379/88.13 |
| 5,742,905 | A | * | 4/1998 | Pepe et al. ................... 455/461 |
| 5,781,857 | A | * | 7/1998 | Hwang et al. ............... 455/412 |
| 5,809,415 | A | * | 9/1998 | Rosemann ................. 455/31.2 |
| 5,861,818 | A | * | 1/1999 | Ohtsuki ....................... 455/517 |
| 5,946,629 | A | * | 8/1999 | Sawyer et al. .............. 455/466 |

FOREIGN PATENT DOCUMENTS

EP            0693860 A2 * 1/1996             H04Q/7/32

OTHER PUBLICATIONS

Giovanni Martini et al., "Distributed Architecture for Applications based on the GSM SHort Message Service," IEEE, 1995, pp. 140–145, 1995.*

* cited by examiner

Primary Examiner—Nay Maung
Assistant Examiner—Quochien B. Vuong
(74) Attorney, Agent, or Firm—J. A. Ligon

(57) ABSTRACT

A method of accessing a text file comprised of individual messages from a cellular telephone comprises the steps of: accessing the text file; selecting one of the individual messages from the text file; formatting the selected message with a network resident user agent; sending the formatted message to the cellular telephone.

25 Claims, 2 Drawing Sheets

E-MAIL ACCESS FROM CELLULAR/PCS PHONES USING USER AGENTS

FIELD OF THE INVENTION

This invention relates generally to wireless communications, and more particularly to e-mail access from a cellular/PCS phone.

BACKGROUND OF THE INVENTION

Advances in technology have enabled high speed wireless communication and spurred the growth of wireless, and now mobile computing systems. Wireless communication for electronic equipment is frequently desirable for data transfer and monitoring.

Personal Communication Services (PCS) are a broad range of individualized telecommunication services which enable individuals or devices to communicate irrespective of where they are. Personal Communication Networks (PCN) are a new type of wireless telephone system communicating via low-power antennas. PCNs offer a digital wireless alternative to the traditional wired line.

E-mail was one of the first services developed on the Internet. Today, e-mail is an important service on any computer network, not just the Internet. E-mail involves sending a message from one computer account to another computer account. E-mail is used to send textual information as well as files, including graphic files, executable file, word processing and other files. E-mail is becoming a popular way to conduct business over long distances. Using e-mail to contact a business associate can be faster than using a voice telephone, because the recipient can read it at a convenient time, and the sender can include as much information as needed to explain the situation.

Currently, a user of a personal communication device utilizes a communicator with a full range of features and components, including many that may not be needed or desired. This results in a collection of devices, a mobile telephone for conversations, a module computing device for e-mail access, a mobile fax, and other devices.

Therefore, there is a need for accessing e-mail directly from a cellular telephone.

SUMMARY OF THE INVENTION

In accordance with the present invention, there is provided a method of accessing a text file comprised of individual messages from a cellular telephone. The method comprises the steps of: accessing the text file; selecting one of the individual messages from the text file; formatting the selected message with a network resident user agent; sending the formatted message to the cellular telephone.

BRIEF DESCRIPTION OF THE DRAWINGS

A more complete understanding of the present invention may be obtained from consideration of the following description in conjunction with the drawings in which.

DETAILED DESCRIPTION OF VARIOUS ILLUSTRATIVE EMBODIMENTS

Although the present invention is particularly well suited for use with a Mobile Telephone Cellular Systems and shall be described with respect to this application, the methods and apparatus disclosed here can be applied to other cellular systems including PCS.

Figure 1:
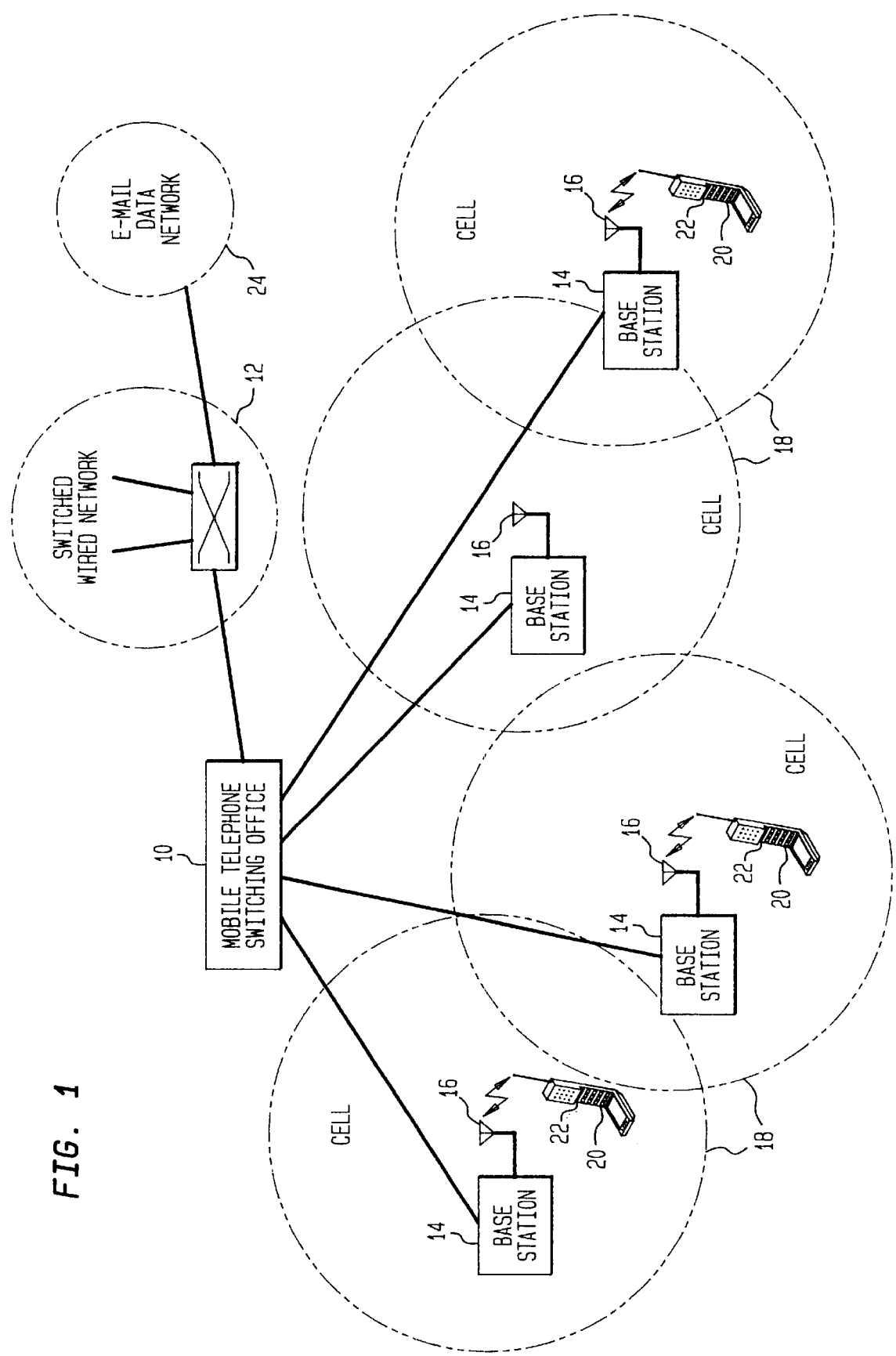
FIG. 1 is an illustrative block diagram a communication system utilizing the present invention.

Referring now to FIG. 1 there is shown a block diagram of a wireless network. A Mobile Telephone Switching Office (MTSO) 10 contains the field monitoring and relay stations for switching calls between the cellular network and the switched wired network 12. The MTSO controls the entire operation of a cellular system, monitoring all cellular calls, and tracking the location of all cellular-equipped vehicles traveling in the system, arranging hand-offs, and providing billing information. The MTSO is connected to a plurality of base stations 14. The base station 14 is the fixed transceiver in the wireless network, which is coupled through a radio port to a cellular antenna 16. The geographical area for which a base station 14 acts as the gateway is called its cell 18, the various base station 18 nodes are distributed at suitable locations. A mobile unit 20 communicates with a base station 14 within a cell 18. The mobile unit 20 contains an alphanumeric display 22. Cellular systems utilize Short Message Service (SMS) to send or receive short alphanumeric messages to or from mobile units 20. The switched wired network 12 can access an e-mail data network 24. The e-mail data network 24 may be coupled to the Internet or a stand alone network.

Figure 2:
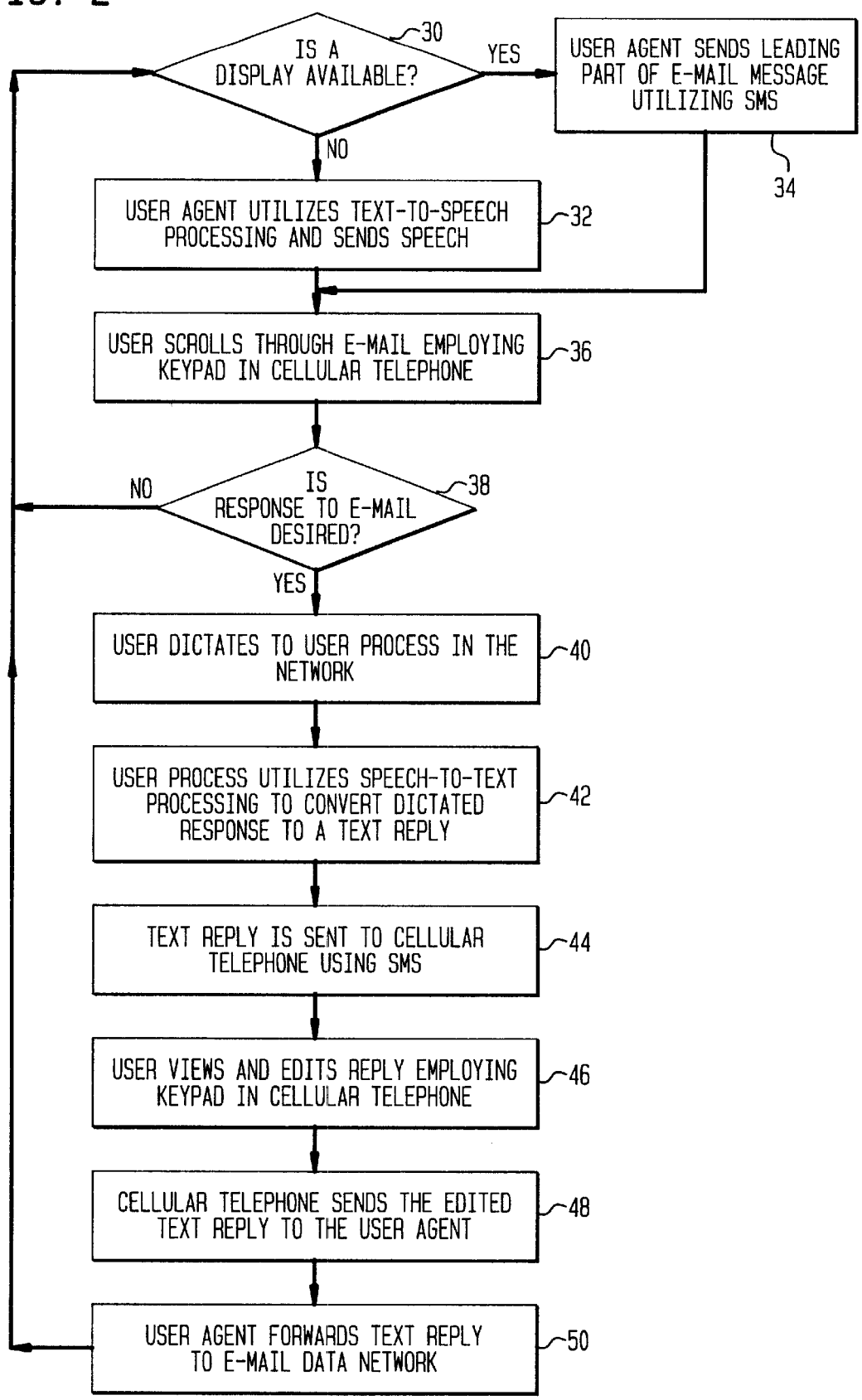
FIG. 2 is a block diagram of e-mail access from a cellular telephone.

FIG. 2 is a flow chart of the present invention, a method for e-mail access from cellular telephones. In step 30 it is determined if a display available for use on the cellular telephone. If a display is available, the message is displayed, by a network resident user agent sending the leading part of the e-mail message utilizing SMS in step 32. If a display is not available, or the user has selected a verbal interface, in step 34 the user agent utilizes text-to-speech processing and sends speech.

In simple terms, a user agent is a representative or a proxy of an end device inside the network. Agents are programs or a set of cooperating programs providing autonomous, high-level services for a user. Each end device has its own associated user agent. The two cooperate to facilitate message delivery functions. A user agent helps overcome air interface and end device constraints, and enhances personalizability of services provided to a subscriber.

After receiving the SMS data or verbal message, in step 36 the user scrolls through their e-mail employing the keypad in cellular telephone. In step 38 it is determined if a response to the e-mail message is desired. If a response is desired, in step 40, the user dictates to a user process in the network. The user process utilizes speech-to-text processing to convert the dictated response to a text reply in step 42. The text reply is sent to cellular telephone using SMS in step 44. A user views and optionally edits the reply in step 46, employing the keypad in cellular telephone. In step 48, the cellular telephone sends the edited text reply to the user agent. The user agent forwards the text reply with proper formatting in step 50 to the e-mail data network 24.

Optionally the mobile unit 20 provides automatic notification of the presence of unread e-mail. The notification can be active, wherein the mobile unit 20 is contacted when there is unread e-mail for a user. The notification can be periodic, such as every 10 minutes, etc. Where unread e-mail is grouped before the user is contacted. E-mail can have a priority associated with it. This priority can be utilized to determine the type of notification that is made, i.e. when a message is flagged as urgent, immediate notification can occur. The time delay, handling of messages based upon priority, and the enabling/disabling of unread e-mail notification can all be set my the user from their mobile unit 20.

In an additional enhancement, the system can notify the user of unread e-mail utilizing the sender of the message as a criteria, wherein the sender is compared to a user maintained list of important e-mail senders.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all modifications which come within the scope of the appended claim is reserved.

What is claimed:

1. In a communication system operative to provide a wireless communications link between a mobile unit and a fixed network, wherein a set of communication services supported by said system includes a data transmission service operable to transmit data in a known format and said mobile unit includes a display adapted to accept and display alphanumeric characters in said known data format, and further wherein said data transmission service is provided on a non-interactive basis, a method for retrieval by said mobile unit of a message addressed to and stored at a destination address other than an address of said mobile unit, and provided in a format other than said known data format, comprising the steps of:

providing a software-implemented user agent in said fixed network operating as a proxy for said mobile unit and enabled to manage interface compatibility for messages exchanged between said mobile unit and said fixed network;

causing said user agent to select and retrieve a message addressed to and stored at a destination address other than a mobile unit address for a user associated with said user agent from a plurality of messages provided in said other format and stored at said destination address other than said mobile unit address, wherein neither the header nor the message data of the retrieved message includes an address translatable by said communication system for said user agent or for said mobile unit;

causing said user agent to convert said other format of said selected message to said known data format used by said mobile unit; and transmitting said selected message from said user agent to said mobile unit.

2. The method as recited in claim 1 wherein said format conversion of said selected message includes a text to speech conversion for direct speech presentation of said selected message on the mobile unit.

3. The method as recited in claim 1 wherein said known data format of said selected message is a short-message-service format.

4. The method as recited in claim 1 further comprising the step of notifying the mobile unit automatically upon the presence of an unread message.

5. The method as recited in claim 4 wherein the step of notifying is delayed for a predetermined time interval.

6. The method as recited in claim 4 wherein the step of notifying is conditioned upon a priority of said unread message.

7. The method as recited in claim 4 wherein the step of notifying is conditioned upon an id of a sender of said unread message.

8. The method as recited in claim 1 comprising the additional step of replying to said selected message.

9. The method as recited in claim 8 wherein the step of replying comprises:

dictating a response;

formatting said response with said resident user agent; and, sending said formatted response to said mobile unit for reviewing.

10. The method as recited in claim 9 wherein the step of formatting said response comprises formatting said response utilizing a speech to text conversion method for direct presentation on the mobile unit.

11. The method as recited in claim 9 wherein the step of formatting said response comprises formatting said response in a short message service format for display on the mobile unit display.

12. The method as recited in claim 9 further comprising the additional step of fowarding said response with a network resident agent.

13. In a wireless communications system operable to provide Short Message Service (SMS), a method for retrieval by a mobile unit in communication with said wireless communications system of a non-SMS formatted message addressed to and stored at a destination address other than an address of said mobile unit, said mobile unit having a display enabled to accept an alphanumeric message in an SMS format, said method comprising the steps of:

causing a software-implemented user agent established in a fixed network portion of said wireless system as a proxy for said mobile unit to select and retrieve a message addressed to and stored at a destination address other than a mobile unit address for a user associated with said user agent, wherein neither the header nor the message data of the retrieved message includes an address translatable by said communication system for said user agent or for said mobile unit;

causing said user agent to format said selected message for direct presentation on the mobile unit display in an SMS format;

sending said formatted message to the mobile unit, wherein said selected message is presented on the mobile unit display in the SMS format.

14. The method as recited in claim 13 wherein the step of formatting comprises formatting said selected message utilizing a text to speech conversion method for direct presentation on the mobile unit.

15. The method as recited in claim 13 wherein the step of formatting comprises formatting said selected message in a short message service format for display on the mobile unit diplay.

16. The method as recited in claim 13 further comprising the step of notifying the mobile unit automatically upon the presence of an unread message.

17. The method as recited in claim 16 wherein the step of notifying is delayed for a predetermined time interval.

18. The method as recited in claim 16 wherein the step of notifying is conditioned upon a priority of said unread message.

19. The method as recited in claim 16 wherein the step of notifying is conditioned upon an id of a sender of said unread message.

20. The method as recited in claim 13 comprising the additional step of replying to said selected message.

21. The method as recited in claim 20 wherein the step of replying comprises:

dictating a response;

formating said response with said resident user agent; and, reviewing said formatted response.

22. The method as recited in claim 21 wherein the step for formatting said response comprises formatting said response utilizing a speech to text conversion method for direct presentation on the mobile unit.

23. The method as recited in claim 21 wherein the step of formatting said response comprises formatting said response in a short message service format for display on the mobile unit diplay.

24. The method as recited in claim 21 further comprising the additional step of fowarding said response with a network resident agent.

25. In a communication system operative to provide a wireless communications link between a mobile unit and a fixed network, wherein a set of communication services supported by said system includes Short Message Service (SMS) and said mobile unit includes a display adapted to accept and display alphanumeric characters in an SMS format, a method for retrieval by said mobile unit of a non-SMS formatted message addressed to and stored at a destination address other than an address of said mobile unit, comprising the steps of:

providing a software-implemented user agent in said fixed network operating as a proxy for said mobile unit and enabled to manage interface compatibility for messages exchanged between said mobile unit and said fixed network;

causing said user agent to select and retrieve a message addressed to and stored at a destination address other than a mobile unit address for a user associated with said user agent from a plurality of non-SMS formatted messages stored at said destination address other than said mobile unit address, wherein neither the header nor the message data of the retrieved message includes an address translatable by said communication system for said user agent or for said mobile unit;

causing said user agent to convert the non-SMS format of said selected message to the SMS format used by said mobile unit; and transmitting said selected message from said user agent to said mobile unit.

\* \* \* \* \*